(12) United States Patent
Ruan

(10) Patent No.: US 7,559,729 B2
(45) Date of Patent: Jul. 14, 2009

(54) RAPID ROTATING DEVICE FOR RATCHET BELT SHAFT

(75) Inventor: Bu Qin Ruan, Zhejiang (CN)

(73) Assignee: Asian Industrial Products, Inc., Fort Lee, NJ (US)

( * ) Notice: Subject to any disclaimer, the term of this patent is extended or adjusted under 35 U.S.C. 154(b) by 203 days.

(21) Appl. No.: 11/182,332

(22) Filed: Jul. 14, 2005

(65) Prior Publication Data

US 2006/0013667 A1    Jan. 19, 2006

(30) Foreign Application Priority Data

Jul. 14, 2004    (CN) .......................... 2004 1 0052805
Jul. 14, 2004    (CN) .................... 2004 2 0037526 U

(51) Int. Cl.
    B60P 7/08    (2006.01)
(52) U.S. Cl. ..................... 410/103; 410/100; 254/217; 254/353
(58) Field of Classification Search ................. 410/12, 410/103, 100; 254/217, 218, 223, 307, 308, 254/320, 353, 354, 369; 242/396.4; 192/46
    See application file for complete search history.

(56) References Cited

U.S. PATENT DOCUMENTS

| | | | |
|---|---|---|---|
| 369,159 A | 8/1887 | Burns | |
| 489,140 A | 1/1893 | Bernstrom | |
| 500,529 A | 6/1893 | Burns | |
| 726,421 A | 4/1903 | Garrett | |
| 1,364,530 A | 1/1921 | Tompkins | |
| 2,549,932 A * | 4/1951 | Reitz | |
| 2,946,563 A | 7/1960 | Eaton | |
| 3,051,445 A | 8/1962 | Moulton | |
| 4,273,486 A | 6/1981 | Tatina | |
| 4,333,362 A | 6/1982 | Sugioka et al. | |
| 5,101,537 A | 4/1992 | Cummings | |
| 5,156,506 A | 10/1992 | Bailey | |
| 5,433,565 A * | 7/1995 | Chan | 410/103 |
| 6,494,435 B1 | 12/2002 | Cauchon | |
| 6,698,723 B1 | 3/2004 | Antonini | |
| 6,824,121 B2 | 11/2004 | Boice | |
| 6,824,339 B1 | 11/2004 | Childers | |
| 2004/0046077 A1 | 3/2004 | Kramer | |
| 2004/0155230 A1 | 8/2004 | Fortin | |

* cited by examiner

Primary Examiner—Stephen Gordon
(74) Attorney, Agent, or Firm—Bergman & Song LLP

(57) ABSTRACT

A ratchet mechanism for a cargo tie-down includes a unidirectional coupling. The unidirectional coupling is adapted to receive a bidirectional torque at an input thereof, and provide a unidirectional torque to a belt shaft at an output thereof.

4 Claims, 3 Drawing Sheets

RAPID ROTATING DEVICE FOR RATCHET BELT SHAFT

CROSS-REFERENCE TO RELATED APPLICATIONS

The present application claims priority to Chinese patent application numbers 200410052805-7 and 200420037526-9, both filed Jul. 14, 2004, the disclosures of which are herewith incorporated by reference in their entirety.

FIELD OF THE INVENTION

The present invention relates to a tie-down, and more particularly to a ratchet tie-down.

BACKGROUND

When goods are transported by automobile, the goods need to be secured to prevent the goods from falling off the automobile, or colliding with one another to induce damage. It is a common practice to tie goods down to the bed of a truck with ropes. This may be a time consuming process, however. Tying with ropes requires a lot of effort, and it is difficult to secure the goods properly.

A ratchet is an advanced tying tool. Ratchets have been well received among truck drivers due to their ease of use and to safety concerns when otherwise tying down the goods. As shown in FIG. 5, there is a frame 4 and belt shaft 3 on the ratchet with belt shaft 3 located on the frame 4. The belt shaft can be turned. The tie-down belt is then wrapped around the belt shaft 3, and can be tightened when turning the belt shaft 3, so as to retract the belt.

The current method of tying involves turning the belt shaft 3 by using a crowbar to stick through a crowbar hole 9. Due to the fact that the ratchet is attached to the truck bed, it is necessary to remove the crowbar from the crowbar hole 9 after the belt shaft 3 has been turned through a certain angle, and re-insert the crowbar into the crowbar hole at a different angle.

Obviously, this is a slow process, and it takes a lot of effort. In the meantime, it is possible to cause harm to fingers or other body parts due to frequent insertions and removals of the crowbar.

SUMMARY OF THE INVENTION

The present invention resolves many of the issues mentioned above. This invention provides a rapid rotating device such that it will not be necessary to remove and insert the crowbar during operation. Thus easy, effortless operation is achieved, and tie-down speed is increased while ensuring safe and reliable operation.

This invention is realized through the following technical solutions: the rapid rotating device for use with the ratchet belt shaft is arranged on a side of the belt shaft that is next to the ratchet frame. The characteristics of the rapid rotating device are: the device includes a fixed base and a rotating body. The fixed base is attached firmly to the belt shaft, and the rotating device is fit circumferentially around the fixed base on one side. A unidirectional link-drive mechanism is located at the contacting surface between the fixed base and the rotating body, and at least one crowbar hole is present on the rotating body.

In the aforementioned ratchet belt shaft rapid rotating device, the unidirectional link-drive mechanism includes several spring holes located at the contacting surface between the rotating body and the fixed base. Each spring hole includes one spring and a push-pin. The pushpin is adapted to push against the side of the fixed base due to spring force. An equal number of aligned slide grooves are located on the side of the fixed base. One side of each slide groove is inclined toward the direction of rotation of the rotating device, and extended to a side surface of the fixed base, while the other side of each groove is disposed perpendicular to the side surface of the fixed base.

While turning the rotating body toward the inclined surfaces of the slide grooves during usage, the pushing-pins will slide up along the inclined side of the grooves, and push the pushing-pins into the spring holes until the pushing-pins slide onto the side surface of the fixed base. The pushing-pins will fall into the next slide grooves if the rotating body is turned further, and the whole slide-up-fall-in action of the pushing-pins will be repeated. Obviously, turning the rotating body in one direction will not drive the belt shaft since the fixed base is not turned by the rotating body.

On the other hand, if turning the rotating body in the reverse direction, the pushing-pins will be stopped by the perpendicular side of the slide grooves after sliding into the grooves. Thus the rotating body will be unable to turn further without turning the fixed base. This results in a link-drive relationship between the fixed base and rotating body. Under the turning moment of the rotating body, the fixed base will follow accordingly and thus drive the belt shaft.

When applying the rotating device toward the ratchet, it is necessary to ensure the direction of rotation of the link-drive mechanism, between fixed base and the rotating body, is the same as the tightening direction of the belt shaft. Thus it is only necessary to turn the crowbar back and forth, after putting the crowbar into the crowbar hole on the rotating body, to tighten the belt. Since the fixed base can only rotate unidirectionally, this back-and-forth motion will be enough to tighten the belt. After the tightening is complete, simply remove the crowbar from the hole.

Compared to the current method of inserting a crowbar directly into a bore in the end of the belt shaft, a ratchet utilizing the rapid rotating device of the invention possesses benefits such as safe, reliable and effortless operation; no need to remove and re-insert the crowbar, and won't harm the product or the operator. In the meantime, there is no restriction on the latitude of forward and backward motion on the crowbar, which increases the ease of use of the ratchet, and improves the speed of tying, resulting in higher practical value.

In the figures, 1: Fixed base; 2. Rotating body; 3: Belt shaft; 4: Supporting frame; 5: Slide groove; 6: Spring hole; 7: Spring; 8: Pushing-pin; 9: Crowbar hole; 10: Locating plate; 11: Screw.

DETAILED DESCRIPTION OF THE INVENTION

Figure 1:
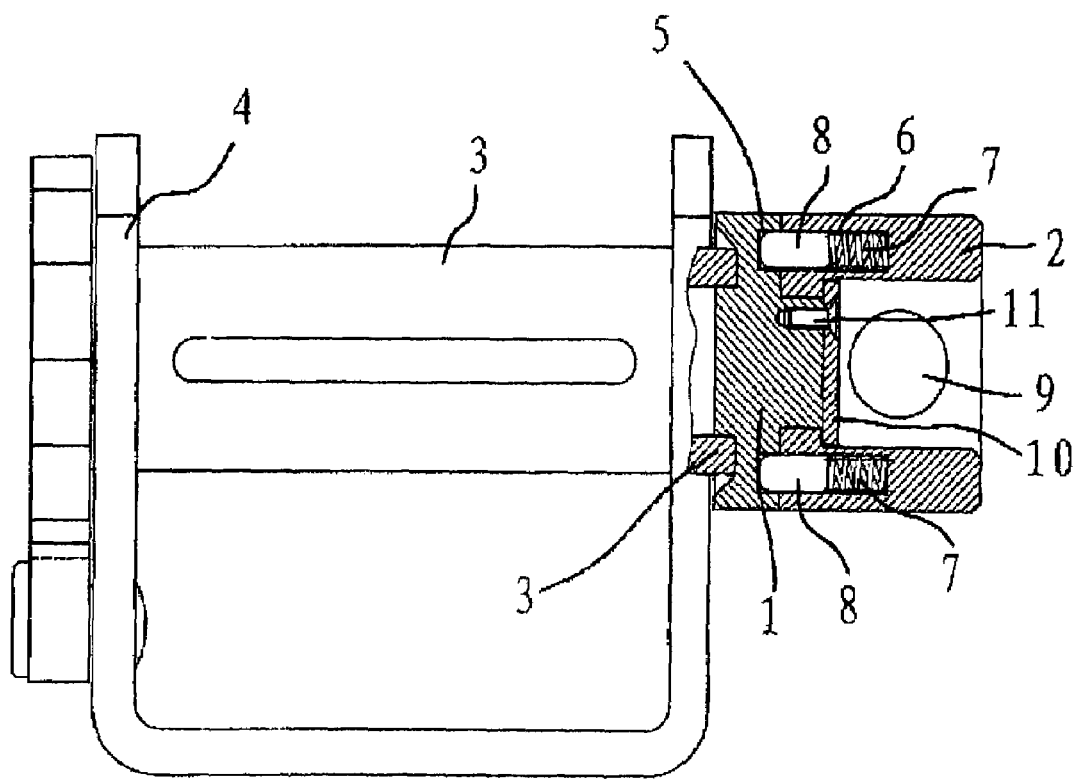
FIG. 1 is a mechanical schematic of the rapid rotating device for a ratchet.

As shown in FIG. 1, the rapid rotating device is supported on the extended part of the belt shaft 3 that is disposed outwardly of the ratchet supporting frame 4. The device includes a fixed base 1 and a rotating body 2. Belt shaft 3 can be rotated, and is installed on the ratchet supporting frame 4. When in use, belt shaft 3 is wrapped with a belt. Fixed base 1 is firmly attached to belt shaft 3.

Rotating body 2 is inserted circumferentially along the side of the fixed base 1. In this example, a retaining plate 10 is installed to capture the rotating body 2 adjacent fixed base 1. Thus rotating body 2 is socketed onto the fixed base 1, and is attached onto the fixed base 1 by means of bolt-down screws 11 through locating plate 10. By adapting mechanisms as above, rotating body 2 is well attached to the fixed base 1, and can be rotated against fixed base 1.

Figure 2:
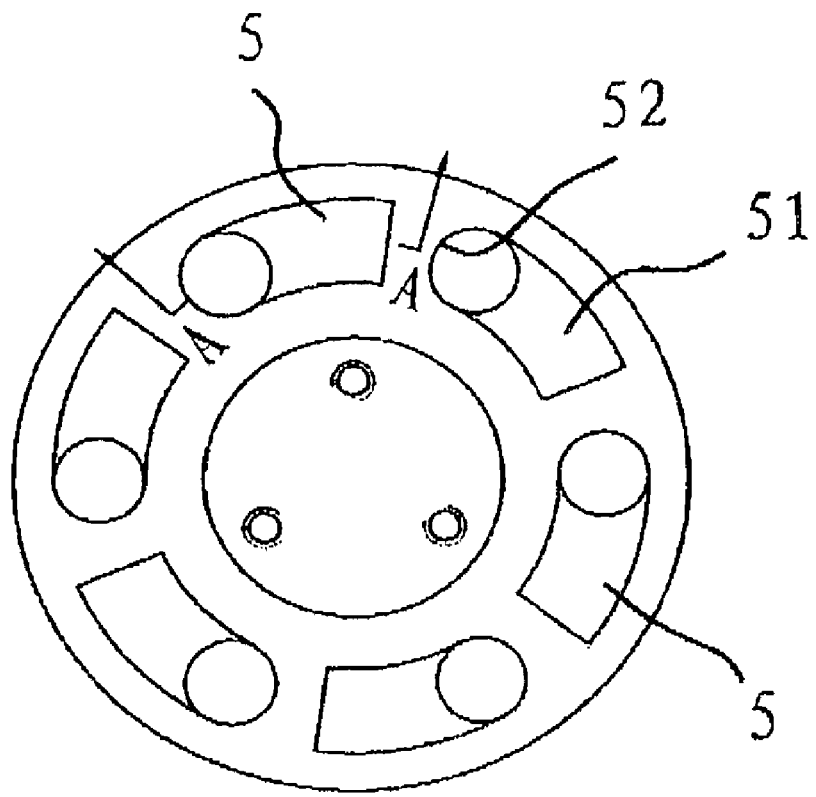
FIG. 2 is a side-view diagram of a fixed base for a rapid rotating device.
Figure 3:
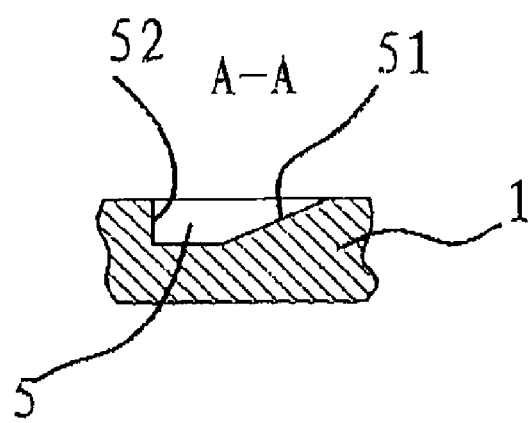
FIG. 3 is a cross-section diagram along A-A line in FIG. 2.
Figure 4:
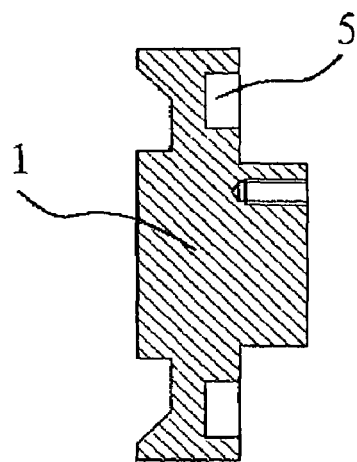
FIG. 4 is a cross section view of the fixed base for the rapid rotating device.
Figure 5:
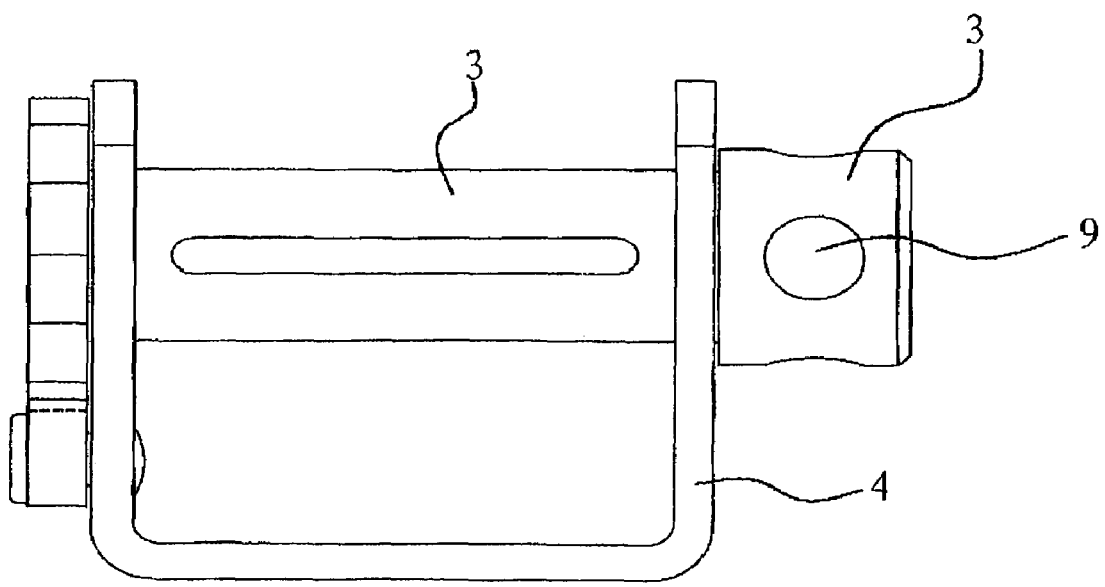
FIG. 5 is a mechanical schematic of a regular ratchet along the belt shaft.

As shown in FIG. 1, rotating body 2 includes a crowbar hole. A straight side 52 is perpendicular to the side surface of the fixed base as shown in FIG. 2. Inclined side of the groove 51 is inclined toward the rotating direction of the rotating body 2, and extended to the side surface of the fixed base 1.

As shown in FIG. 1, there are 6 equally spaced spring holes 6 that correspond to the slide grooves 5. Into each of the holes is disposed a spring 7 and a pushing-pin 8. The size of pushing-pin 8 is a little smaller than the size of slide groove 5, such that pushing-pin 8 can be inserted into slide groove 5. When the rotating body 2 is rotated to the location where spring hole 6 is mated with slide groove 5, the pushing-pin 8 will be pushed into the slide groove 5 by the acting force of spring 7.

If the rotating body 2 is turned in the direction of the inclined side of the slide groove, pushing pin 8 will be pushed up along the inclined face 51 of the slide groove 5 until pushing-pin 8 is pressed against the side surface of fixed base 1. If the rotating body 2 is turned in the opposite direction, the pushing-pin 8 will be blocked by the straight face 52 of the slide groove 5, and unable to slide out of groove 5. At this time, the rotating body 2 and fixed base 1 will become a link-drive system, thus driving the belt shaft 3.

While turning the rotating body 2 back and forth, it is only possible to turn the fixed base in one direction. Thus if a crowbar is inserted into the crowbar hole 9 and the crowbar is rotated in reciprocating fashion, the belt shaft 3 will be turned to tighten the belt.

The invention claimed is:

1. A ratchet device comprising:
a first ratchet wheel, said first ratchet wheel being substantially fixedly coupled to a shaft;
a first pawl, said first pawl being adapted to engage said first ratchet wheel;
a second ratchet wheel, said second ratchet wheel being substantially fixedly coupled to said shaft; and
a plurality of second pawls, said plurality of second pawls being adapted to engage said second ratchet wheel, said plurality of second pawls being adapted to move independently of one another and independently of said first pawl,
wherein said second plurality of pawls are urged toward said second ratchet wheel by a respective plurality of springs.

2. A ratchet device comprising:
a first ratchet wheel, said first ratchet wheel being substantially fixedly coupled to a shaft;
a first pawl, said first pawl being adapted to engage said first ratchet wheel;
a second ratchet wheel, said second ratchet wheel being substantially fixedly coupled to said shaft; and
a plurality of second pawls, said plurality of second pawls being adapted to engage said second ratchet wheel, said plurality of second pawls being adapted to move independently of one another and independently of said first pawl,
wherein said second ratchet wheel comprises a first surface, said first surface having a plurality of apertures, said plurality of apertures bounding a respective plurality of recessed surfaces, each recessed surface of said plurality of recessed surfaces including a respective first region disposed substantially perpendicular to said first surface and a respective second region disposed substantially obliquely with respect to said first surface.

3. A ratchet device comprising:
a first ratchet wheel said first ratchet wheel being substantially fixedly coupled to a shaft;
a first pawl, said first pawl being adapted to engage said first ratchet wheel;
a second ratchet wheel, said second ratchet wheel being substantially fixedly coupled to said shaft; and
a plurality of second pawls, said plurality of second pawls being adapted to engage said second ratchet wheel, said plurality of second pawls being adapted to move independently of one another and independently of said first pawl,
wherein said second plurality of pawls are urged toward said second ratchet wheel by a respective plurality of substantially helical springs.

4. A ratchet device comprising:
a first ratchet wheel, said first ratchet wheel being substantially fixedly coupled to a shaft;
a first pawl, said first pawl being adapted to engage said first ratchet wheel;
a second ratchet wheel said second ratchet wheel being substantially fixedly coupled to said shaft; and
a plurality of second pawls, said plurality of second pawls being adapted to engage said second ratchet wheel, said plurality of second pawls being adapted to move independently of one another and independently of said first pawl wherein said second ratchet wheel comprises a first surface, said first surface having a plurality of apertures, said plurality of apertures bounding a respective plurality of recessed surfaces, each recessed surface of said plurality of recessed surfaces including a respective first region disposed substantially perpendicular to said first surface and a respective second region disposed substantially obliquely with respect to said first surface, said respective second region being adapted to slidingly engage said plurality of second pawls.

* * * * *